March 17, 1964 K. F. HAYDEN ET AL 3,125,506
CHELATE SWEETENING
Filed Sept. 19, 1961 2 Sheets-Sheet 1
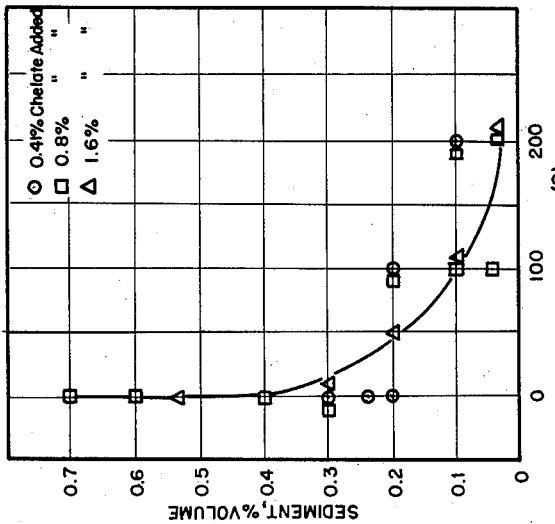
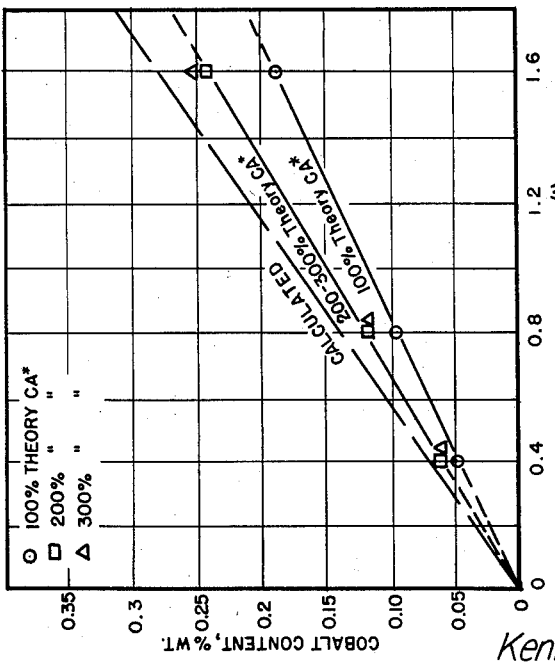
Inventors
Kenneth F. Hayden
Richard N. Lovett
By Oswald G. Hayes
Attorney

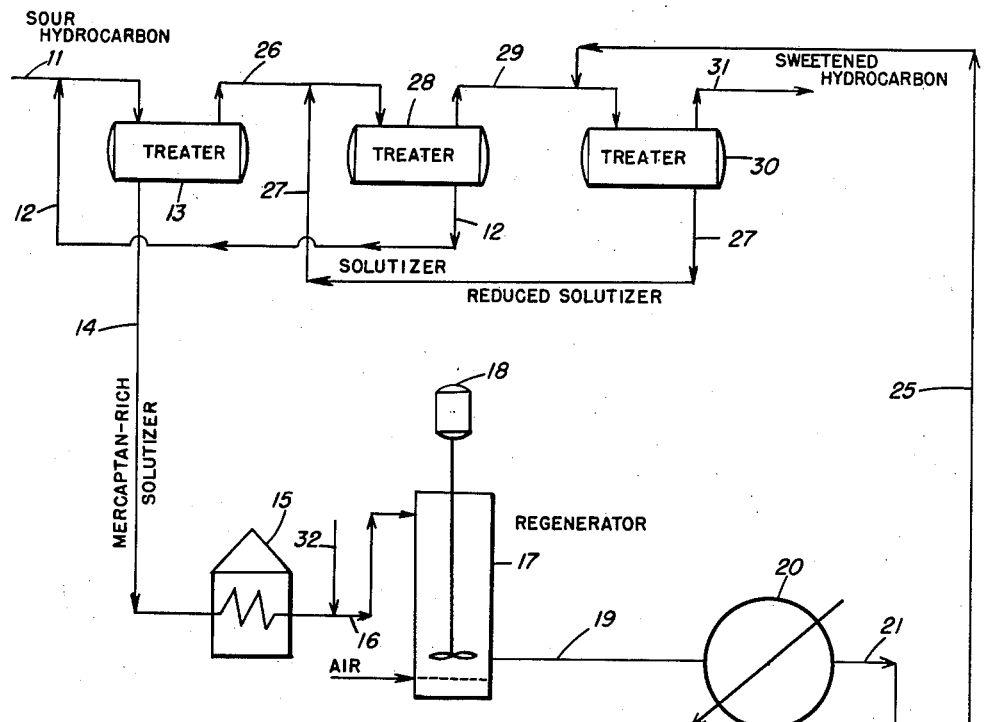
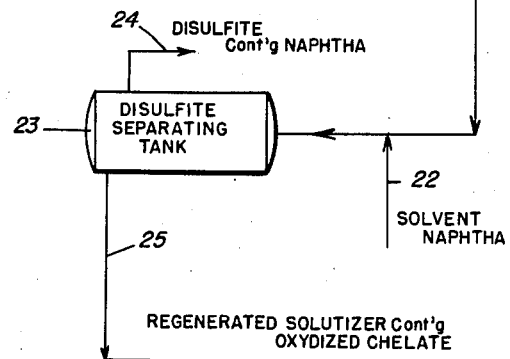
FIG. 2
Inventors
Kenneth F. Hayden
Richard N. Lovett
By Oswald G. Hayes
Attorney United States Patent Office 3,125,506
Patented Mar. 17, 1964

3,125,506
CHELATE SWEETENING
Kenneth F. Hayden and Richard N. Lovett, Woodbury, N.J., assignors to Socony Mobil Oil Company, Inc., a corporation of New York
Filed Sept. 19, 1961, Ser. No. 139,123
4 Claims. (Cl. 208—204)

The present invention relates to sweetening petroleum fractions and, more particularly, to the sweetening of naphtha employing a novel reagent comprising a caustic cresylate solution containing a chelate.

Hereinafter, chelate will be used in the colloquial manner as a noun designating the heterocyclic ring compound. Chelating agent will be used to designate the organic compound which reacts with the metal-containing compound to form the chelate.

The invention described in co-pending application, Serial No. 83,771, filed on January 19, 1961, and now abandoned, of which this is a continuation-in-part, is concerned with sweetening petroleum fractions, particularly gasoline, with homogeneous solutizer solutions, heterogeneous solutizer solutions, or the cresylate layers of heterogeneous solutizer solutions containing at least 0.01 but not more than about 2.0 percent, preferably, 0.3 to 2.0 percent by weight of a chelate, particularly a cobalt chelate in the absence of added solvent for the chelate but containing chelating agent from 100 to 300 percent theory of the stoichiometric equivalent of the metallic ion.

Additional research and experience have shown that the above invention may be further improved upon to obtain more desirable properties of the finished product. The preferred chelate concentration range is now considered to be 0.01 to 0.25 percent by weight of chelate. The previous method is quite satisfactory as regards its sweetening effectiveness. However, the solution using the higher concentration of chelate had the effect of promoting gum formation in the treated finished hydrocarbon. The new lower concentration retains the sweetening effectiveness without the potential gum-forming property of the higher concentration.

The use of chelates to oxidize mercaptans to polysulfides as disclosed in the prior art has required the presence of a solvent for the chelate or solution of the chelate in the hydrocarbon liquid containing the mercaptans to be oxidized. In contrast, it has been discovered, as disclosed in co-pending application, Serial No. 83,771, filed on January 19, 1961, that the chelate can be formed in situ in an aqueous solution of alkali metal hydroxide containing an amount of alkyl phenols sufficient to provide a solution at least 0.5 normal to potassium alkyl phenolate. Furthermore, it has been found also that chelate need not be added continuously as taught by Gislon et al. in U.S. Patent No. 2,659,691 since after contact with gasoline in an amount such that the ratio of chelate to gasoline is one pound per one thousand barrels the treating solution is still active and may still be regenerated for further use.

It has further been found through experience that many refinery operators do not wish to bother with making their own metal chelate in situ at the point of use. They find it more convenient to have it made up in a central distributing point.

This new method involves mixing the chelating agent with an equal weight of a "carrying" liquid such as the lower paraffinic alcohols and water-soluble ketones, and adding the required amount of chelatable metal salt as is illustrated below. The chelate concentrate may then be shipped to the individual refiners who need only add it to the treating solution in the necessary concentration.

It should be noted that the final solutizer solution is still substantially devoid of solvent for the chelate (0.01 to 0.25 percent by weight of the "carrier" solution). This small amount of highly concentrated "carrier" solution is merely useful in shipping and it is not present in sufficient concentration in the solutizer treating solution to affect the properties of the treating solution to any significant degree.

Accordingly, it is an object of the present invention to provide a continuous process for sweetening hydrocarbon mixtures particularly naphthas and especially gasolines wherein a novel agent is used and wherein fresh chelate is not added continuously. It is also within the scope of the present invention to provide a novel sweetening agent comprising an aqueous mixture of at least six percent by weight alkali metal hydroxide, at least five percent by weight alkali metal salt of alkyl phenols derived from petroleum fractions boiling within the range of about 105° F. and about 650° F. and the balance water to make 100 percent to which has been added about 0.01 to about 2.0 percent by weight of a chelate formed by the addition of a water-soluble salt of the chelatable metals of group VIII of the periodic table and containing about 100 to about 300 percent of a theoretical amount of a chelating agent such as the reaction product of an aldehyde and a diamine as disclosed in Table I and nitrosophenols as disclosed in Table II of the Moulthrop U.S. Patent No. 2,651,595. Of the foregoing chelates the chelate of cobalt and N,N¹-disalicylidene-1,2-propane diamine is preferred.

This invention is further aimed at providing a process for sweetening hydrocarbons comprising contacting a sour hydrocarbon with a novel sweetening agent consisting essentially of an aqueous solution containing alkali metal hydroxide and being at least 0.5 normal to the alkali metal salt of alkyl phenols derived from petroleum fractions boiling within the range of 105° F. to about 650° F. and containing about 0.01 to about 0.25 percent by weight of a chelate.

A further object of this invention is to provide a novel chelate treating agent comprising about 0.01 to about 0.25 percent by weight of a chelate dissolved in a caustic solutizer solution, said chelate being added pre-formed, in a "carrier" solution, to the caustic solutizer solution.

Illustrative of the preparation of the novel sweetening reagent is the preparation of a sweetening reagent containing the preferred chelate admixed with either the heterogeneous caustic cresylate solutizer mixture or the cresylate layer of the heterogeneous mixture as the solutizer solution. To a solution containing alkali metal hydroxide, preferably potassium hydroxide, and an alkali metal salt, preferably the potassium salt, of alkyl phenols derived from petroleum fractions boiling within the range of about 105° and about 650° F., and the balance water in proportions such that at a temperature within the range of about 60° F. and about 150° F. a heterogeneous two-phase mixture is formed, and alternatively to the alkyl phenolate, i.e. cresylate, layer of aqueous mixtures containing alkali metal hydroxide, preferably potassium hydroxide, the aforesaid alkyl phenols and water in proportions such that at a temperature within the range of about 60° F. and about 150° F. two substantially mutually immiscible layers (an upper liquid aqueous cresylate and a lower aqueous alkali metal hydroxide) are formed, a water soluble salt of the chelatable metal such as $CoCl_2 \cdot 6H_2O$ is added in the amounts indicated in Table I. In the presence of air the chelating agent is added in an amount required to react with the cobalt added. The additions of water soluble metal salt and chelating agent are made in the presence of oxygen and with agitation of the cresylate solution to ensure the formation of the oxygenated form of the chelate and its distribution throughout the sweetening reagent. It is to be observed that the solubility of the chelate in the cresylate sweetening reagent is dependent upon maintaining the chelate in its oxygenated form. Substitution of nitrogen for air in studies of continuous sweetening resulted in the formation of insoluble material and failure to sweeten the petroleum fraction.

The solubility of the chelate in several alkaline solutions as determined by cobalt analysis of the sediment formed is shown in Table I.

TABLE I

| Solvent | Chelate, Percent Wt. | Chelating Agent, Percent Theory | Insolubles, Percent Vol.[1] | Cobalt Content, Percent Wt.[2] |
|---|---|---|---|---|
| Water | 0.19 | 100 | Nil | |
|  | 0.38 | 100 | Nil | |
|  | 0.58 | 100 | Trace | |
|  | 1.60 | 100 | Trace | |
| 20% NaOH | 0.08 | 100 | 0.51 | |
|  | 0.08 | 200 | Trace | |
|  | 0.16 | 100 | 1.44 | |
|  | 0.8 | 100 | 2.1 | |
|  | 1.6 | 100 | 2.9 | |
| 85% NaOH [3]–15% Cresols | 0.1 | 200 | <0.10 | |
|  | 0.3 | 200 | 0.14 | |
|  | 0.5 | 200 | 0.14 | |
|  | 1.0 | 200 | 0.20 | |
| 90% NaOH [4]–10% Cresols | 0.25 | 200 | 0.14 | |
|  | 0.5 | 200 | 0.12 | |
|  | 1.0 | 200 | 0.12 | |
| 95% NaOH [4]–5% Cresols | 0.25 | 200 | 0.06 | |
|  | 0.5 | 200 | 0.18 | |
|  | 1.0 | 200 | 0.30 | |
| 5 N KOH–1 N KAP | 0.08 | 100 | 0.11 | |
|  | 0.8 | 100 | 0.25 | |
|  | 1.6 | 100 | 0.63 | |
| 4 N KOH–2 N KAP | 0.4 | 100 | 0.32 | 0.049 |
|  | 0.4 | 200 | 0.23 | 0.054 |
|  | 0.4 | 300 | 0.11 | 0.053 |
|  | 0.08 | 100 | 0.34–0.74 | 0.098 |
|  | 0.8 | 200 | 0.19 | 0.119 |
|  | 0.8 | 300 | 0.11 | 0.121 |
|  | 1.6 | 100 | 0.57 | 0.184 |
|  | 1.6 | 150 | 0.21 | |
|  | 1.6 | 200 | 0.11 | 0.241 |
|  | 1.6 | 300 | <0.11 | 0.253 |
| 3 N KOH–3 N KAP | 0.08 | 100 | 0.53 | |
|  | 0.8 | 100 | 0.32 | |
|  | 1.6 | 100 | 1.26 | |
| 6 N KOH–3 N KAP | 0.8 | 100 | 0.26 | |
|  | 1.6 | 100 | 1.75 | |

[1] After centrifuging the solution for 15 minutes.
[2] Solution after centrifuging.
[3] 20% by weight NaOH.
[4] 25% by weight NaOH.

The chelate is almost completely soluble in aqueous alkali metal cresylate solutions in amounts up to about two percent by weight but is relatively insoluble in aqueous solutions of alkali metal hydroxide only. In 4 N KOH–2 N KAP (4 normal potassium hydroxide–2 normal potassium salt of phenols boiling in the range of 386° to 414° F.) the solubility of the chelate is about 70 percent of the amount added. (4 N KOH–2 N KAP solution consists of 18 percent by weight free KOH, 24 percent by weight KAP, and the balance, 58 percent by weight, water.) In certain cases it is advantageous to add 100 to 200 percent in excess of the theory of chelating agent to minimize sediment formation. When the amount of chelating agent added is 100 to 200 percent in excess of the theoretical amount of chelating agent required to react with all of the metal, i.e., when 200 to 300 percent of theory, is added the solubility of the chelate approaches 90 percent of the amount added to the cresylate solution. The solubility of the chelate and the amount of sediment produced in 4 N KOH–2 N KAP solution are graphically illustrated in FIGURES 1A and 1B.

The addition of chelate has a negligible effect upon the viscosity of the cresylate solution. The viscosity of 4 N KOH–2 N KAP solution containing 0.5 to 2.0 percent by weight of oxygenated chelate ranged from 3.79 to 4.23 centistokes at 100° F. as compared with 3.70 centistokes for the solution without chelate.

In continuous runs, a chelate concentration of 0.5 percent by weight of solution was used (Table II–B). Cobalt chelates of this type are considered to absorb one mol of oxygen for each two mols of chelate. On this basis a treating solution containing 1 percent by weight of chelate at a treating ratio of 0.1 volume of treating solution per volume of gasoline, i.e., treating ratio is 0.1, contains about 300 percent of the theoretical amount of oxygen required for the oxidation of 100 p.p.m. of mercaptan-sulfur (RSH—S) in the gasoline. At the 100 p.p.m. RSH—S level, a treating solution containing 0.5 percent by weight of chelate gave about the same results as a treating solution containing 1 percent by weight of chelate (Table II–A).

TABLE II–A

[Stock: Full Boiling Range Catalytic Gasoline—Treating solution: 4 N KOH–2 N KAP]

| | | |
|---|---|---|
| Vol. Soln./vol. gasoline | 0.1 | |
| Pressure, p.s.i.g. | 70 | |
| Temperature, ° F. | 85 | |
| Mix valve pressure drop, p.s.i.g. | 10 | |
| Additional contact time | none | |
| Treating solution | recycled | |
| Chelate content, percent wt. of soln. | 0.5 | 1.0 |
| Chelating agent, percent of theory | 200 | 200 |
| RSH—S in untreated gasoline, p.p.m. | 100 | 100 |
| RSH—S in sweetened gasoline, p.p.m. | 4 | 4 |

TABLE II–B

[Stock: Catalytically cracked gasoline, B.P. 90° to 256° F., RSH—S, p.p.m. wt.—nil]

| | | | | |
|---|---|---|---|---|
| RSH—S added, p.p.m.[1] | 29–38 | 29–38 | 110–115 | 110–115 |
| Treating solution:[2] | | | | |
| Treating ratio (Vol. treating soln./vol. gasoline) | 0.1 | 0.1 | 0.1 | 0.1 |
| Chelate content, percent wt. | 0.5 | 0.5 | 0.5 | 0.5 |
| Chelating agent, percent theory | 200 | 200 | 200 | 200 |
| Caustic handling [3] | recycled | recycled | recycled | recycled |
| Product: | | | | |
| Cobalt, p.p.m. wt. | <0.3 | <0.1 | <0.1 | <0.2 |
| RSH—S, p.p.m. wt. | 8 | 3 | 5 | 4 |

[1] Added as n-butyl mercaptan.
[2] 4 N KOH–2 N KAP.
[3] Pressure, 70–90 p.s.i.g.; ΔP mixing valve, 10 p.s.i.g.

The data tabulated in Table III below indicates that the treating solution with the chelate concentration in the range of 0.01 to 0.25 percent by weight is not significantly less effective as a treating agent than the solutizer solutions containing the higher concentrations of chelate which are shown in Table II–B.

TABLE III

*Chelate Sweetening Gasolines at Low Chelate Concentrations*

| Gasoline | Caustic Prewashed Full Range TCC [1] | Lt.Ther.-Hvy.TCC Gasoline [2] | | Full Range TCC, Cat. Poly, Thermal Blend [3] | | | | |
| --- | --- | --- | --- | --- | --- | --- | --- | --- |
| RSH—S | 130 | 10-25 | 10-25 | 25 | 11 | 24 | 29 | 7 |
| Chelate Concentration, wt. Percent | 0.03 | 0.05 | 0.10 | 0.052 | 0.012 | 0.012 | 0.058 | 0.029 |
| Solution/Gasoline, vol. ratio | 0.3 | 0.1 | 0.1 | 0.1 | 0.1 | 0.1 | 0.1 | 0.1 |
| RSH (p.p.m.) of Product | Nil | 7 | Dr Neg | Dr Neg | Dr Neg | 5 | 3 | 1 |
| Solutizer Soln | 3 N KOH-1.4 N KAP | 20° Bé. NaOH (+10% Cresols) | | 20° Bé. NaOH (+5% Cresols) | | | | |

[1] Catalytically cracked gasoline.
[2] Thermally cracked gasoline, light fraction.
[3] Catalytically polymerized gasoline.

Generally, this novel reagent may be prepared as illustrated above, or by adding to a suitable "carrier liquid," which is a solvent for the chelate (e.g. water-soluble ketones such as cyclohexanone, lower aliphatic alcohols, etc.), in approximately equal amount of a chelating agent and an amount of a soluble salt of a chelatable metal which is less than the stoichiometric quantity necessary to completely react with the chelating agent, for example, 85 to 95 percent of the stoichiometric quantity.

Specifically, in ten pounds of cyclohexanone, which is superior to materials previously used in that there is substantially no crystallization of the chelate during storage, dissolve ten pounds of a chelating agent such as $N,N^1$-disalicylidene-1,2-propane diamine. To this, add approximately 6.5 pounds, slightly less than the stoichiometric quantity, of a soluble salt of a chelatable metal, such as $CoCl_2$. The cyclohexanone solution of the chelate may be stored until needed, when the refiner will add the chelate solution to the caustic solutizer treating solution to bring it to the desired chelate concentration in the range of about 0.01 to about 0.25 percent chelate.

An especially effective method for using this new lower concentration treating agent is illustrated in FIG. 2 and will be described below.

Spent solutizer solution exhausts from treating unit 13 through line 14 which leads to a heater 15, where the solutizer is heated, for example, to approximately 160° F. The heated solutizer is then passed through line 16 into regenerator 17. Additional chelate is added only when necessary through line 32 into line 16 in order to keep the chelate concentration within the proper limits. The solutizer solution is passed through the tower countercurrently to a stream of oxygen-containing gas, such as air, while it is stirred by mixer 18. The solutizer solution, now containing disulfides and oxygenated chelate is passed through pipe 19 into heat exchanger 20. The cooled solutizer solution then passes into line 21, where it is mixed with a solvent naphtha from line 22. The mixture of naphtha and solutizer is passed into the separating tank 23, from which the naphtha containing the disulfides is taken off through line 24. The regenerated solutizer solution containing oxygenated chelate passes out through line 25.

The regenerated treating solution in line 25 is mixed with a partially sweetened hydrocarbon in line 29. The hydrocarbon-treating solution mixture is discharged from line 29 into treater 30 where it is allowed to settle. The sweetened hydrocarbon is taken overhead through line 31, and the treating solution is taken out through line 27. The treating solution leaving through line 27 should contain chelate substantially in the reduced form. The solutizer solution in line 27 is mixed with the partially treated hydrocarbon in line 26, which mixture is then passed into treater 28 where it is allowed to settle. The partially sweetened hydrocarbon is taken off overhead through line 29, while the partially spent solutizer solution leaves through line 12. The partially spent solutizer in line 12 is mixed with a sour hydrocarbon in line 11, and the mixture is then passed into treater 13. The partially treated hydrocarbon is taken off through line 26 and the spent mercaptan-rich solutizer leaves through line 14.

The concentration of oxygenated chelate in the regenerated solutizer solution in line 25 is just enough to ensure sweetening in the last stage. The chelate should be in the completely reduced state when leaving the third treater 30. In this process the hydrocarbon is partially sweetened by removal of mercaptans in treating stages 13 and 28, and it is sweetened by oxidation of the remaining mercaptans to disulfides in the last treating stage 30.

As an example, the mercaptan content of a sour petroleum naphtha is reduced from 150 to about 20 in the first two extraction stages. In order to completely sweeten the hydrocarbon in the third stage while completely reducing all of the oxidized chelate, the concentration of oxygenated chelate in the treating solution should be about 0.06 percent by weight when operating at a treating ratio of 0.1 volume of treating solution per volume of gasoline.

It should be understood that the above process is merely exemplary of many similar processes which all fall within the purview of this invention.

For example, the spent solutizer solution need not be heated before being passed into the regenerator; however, it is preferred to do so to prevent the dissolution of elemental oxygen in the solutizer solution. In addition, it may not be necessary to use a solvent naphtha to remove the disulfides from the treating solution. A simple settling operation may be used.

Under certain circumstances in actual practice a steam and air blow may be substituted for the air blow described for the regeneration system in the above example. In addition, it may be possible to substitute a single rotating-disk column operated countercurrently which would be the equivalent of the three mixer-settler stages shown in the diagram.

The concentrations and ingredients of the caustic or caustic solutizer treating solution may be varied within the limits of the prior art for the removal of mercaptans and still be within the purview of this invention. The treating ratio may be varied anywhere from about one to about 20 volumes of hydrocarbon per volume of oxygenated chelate-containing treating solution.

The concentration of alkali metal hydroxide and the concentration of alkali metal salt of the aforesaid alkyl phenols or cresols, i.e., the alkyl phenolates or cresylates, can vary over a wide range from the homogeneous, single phase solutions to the cresylate phase of the heterogeneous liquid mixtures which form two phases, i.e., a liquid cresylate phase containing free alkali metal hydroxide, cresylates, and water, and an aqueous alkali metal hydroxide phase, at temperatures within the range of 60° F. to 150° F. as described in U.S. Patent No. 2,850,434. It is to be noted that other solutizers, such as isobutyrate, are not presently useful in chelate sweetening agents substantially devoid of the known solvents for chelates.

The novel chelate sweetening agents are divided on the basis of the concentrations of alkali metal hydroxide and cresylates into dilute solutions and concentrated solutions. Thus, dilute chelate sweetening agents, regardless of the concentration of chelate therein, are aqueous chelate sweetening agents which are 1.0 to 6.0 normal to alkali metal hydroxide and 0.5 to 3.0 normal to cresylate. Strong chelate sweetening agents, regardless of the concentration of chelate therein, are the liquid cresylate phases of heterogeneous mixtures of alkali metal hydroxide, alkali metal cresylates, and water wherein the concentrations of the three components are proportioned so that the mixture separates into a liquid aqueous cresylate phase (as described hereinbefore), substantially immiscible with a liquid aqueous alkali metal hydroxide phase at a temperature within the range of about 60° to about 150° F. Those skilled in the art will recognize that within the scope of the novel chelate sweetening agents are those consisting essentially of alkali metal hydroxide, alkali metal salt of a solutizer other than cresols, and alkali metal salt of cresols in amount sufficient to dissolve the chelate but substantially devoid of known solvents for the chelate.

This invention may be useful for the treating of sour petroleum fractions such as straight run naphthas, cracked gasolines, etc.

The above examples are not in any way intended to limit the scope of the invention as defined by the attached claims.

This application is a continuation-in-part of co-pending application Serial No. 83,771, filed on January 19, 1961.

What is claimed is:

1. A process for decreasing the mercaptan content of a sour hydrocarbon while avoiding formation of gum comprising mixing said hydrocarbon in a first stage with a chelate-containing sweetening agent to remove mercaptans therefrom, said agent having the composition hereinafter described and having the chelate component thereof in a substantially reduced form by virtue of having been previously used to treat sour hydrocarbon, separating the treated hydrocarbon and passing the same to a second stage and coincidently passing spent treating agent to a regenerating step, mixing the sour hydrocarbon in the second stage with previously used sweetening agent to remove additional quantities of mercaptan therefrom, separating the treated hydrocarbon and passing the same to a third stage while coincidentally passing the used sweetening agent to said first stage, said hydrocarbon entering the third stage having a decreased content of mercaptans, mixing the sour hydrocarbon in the third stage with fresh sweetening agent to oxidize mercaptans, said fresh agent having said chelate component in substantially oxidized form and in an amount sufficient to oxidize the decreased mercaptan content of hydrocarbons in the third stage, separating and recovering the hydrocarbon from the third stage in a sweetened condition while coincidently passing the sweetening agent to said second stage, said sweetening agent comprising a preformed mixture of alkali metal hydroxide, alkali metal salt of alkyl phenols derived from petroleum fractions boiling in the range of 105 to 650° F., water, and 0.01 to 0.25% by weight of a chelate of a chelatable metal of group VIII of the periodic table.

2. A process for decreasing the mercaptan content of a sour hydrocarbon comprising mixing said hydrocarbon in a first stage with a chelate-containing sweetening agent to remove mercaptans therefrom, said agent having the composition hereinafter described and having the chelate component thereof in a substantially reduced form by virtue of having been previously used to treat sour hydrocarbon, separating the treated hydrocarbon and passing the same to a final stage and coincidently passing spent treating agent to a regenerating step, said hydrocarbon entering the final stage having a decreased content of mercaptans, mixing the sour hydrocarbon in the final stage with fresh sweetening agent to oxidize mercaptans, said fresh agent having said chelate component in substantially oxidized form and in an amount sufficient to oxidize the decreased mercaptan content of the hydrocarbons in the final stage, separating and recovering the hydrocarbon from the final stage in a sweetened condition while coincidently passing the sweetening agent to said first stage, said sweetening agent comprising a mixture of alkali metal hydroxide, alkali metal salt of alkyl phenols derived from petroleum fractions boiling in the range of 105 to 650° F., water, and 0.01 to 0.25% by weight of a chelate of a group VIII metal selected from the class consisting of iron, cobalt, nickel, and palladium.

3. The method of claim 1 wherein the metal chelate is the chelate prepared from a water-soluble salt of cobalt and N,N'-disalicylidene-1,2-propane diamine.

4. The method of claim 1 wherein the concentration of alkali metal hydroxide is at least 1.5 N and the concentration of the alkali metal salt of the alkyl phenols is at least 0.5 N.

References Cited in the file of this patent

UNITED STATES PATENTS

| | | |
|---|---|---|
| 2,651,595 | Moulthrop | Sept. 8, 1953 |
| 2,744,854 | Urban | May 8, 1956 |
| 2,823,173 | Gislon et al. | Feb. 11, 1958 |
| 2,886,521 | Gislon et al. | May 12, 1959 |
| 2,918,426 | Quiquerez et al. | Dec. 22, 1959 |

FOREIGN PATENTS

| | | |
|---|---|---|
| 209,094 | Australia | June 25, 1957 |